United States Patent [19]
Scanlon, Jr. et al.

[11] Patent Number: 6,010,805
[45] Date of Patent: Jan. 4, 2000

[54] ION CONDUCTING ELECTROLYTE MATERIAL CONTAINING A LITHIUM PORPHYRIN COMPLEX

[75] Inventors: Lawrence G. Scanlon, Jr., Fairborn, Ohio; Wlodzimierz T. Krawiec, Burlington, Mass.; Emmanuel P. Giannelis, Ithaca, N.Y.

[73] Assignee: United States of America as represented by the Secretary of the Air Force, Washington, D.C.

[21] Appl. No.: 09/087,691

[22] Filed: May 26, 1998

[51] Int. Cl.$^7$ ....................................................... H01M 2/14
[52] U.S. Cl. ......................... 429/307; 429/303; 429/310; 429/311; 429/317
[58] Field of Search ................... 429/303, 307, 429/310, 311, 317

[56] References Cited

U.S. PATENT DOCUMENTS

| | | | |
|---|---|---|---|
| 4,251,607 | 2/1981 | Yamaki et al. | 429/194 |
| 4,550,067 | 10/1985 | Horiba et al. | 429/213 |
| 5,252,413 | 10/1993 | Alamgir et al. | 429/192 |
| 5,493,017 | 2/1996 | Therien et al. | 540/145 |
| 5,599,355 | 2/1997 | Nagasubramanian et al. | 29/623.5 |
| 5,620,811 | 4/1997 | Zhang et al. | 429/192 |

OTHER PUBLICATIONS

H. W. Whitlock and R. Hanauer, "Octaethylporphyrin", J. Org. Chem., 1968, vol. 33, No. 5, pp. 2169–2171 (May).

J. S. Lindsey, I. C. Schreiman, H. C. Hsu, P. C. Kearney and A. M. Marguerattaz, "Rothemund and Adler–Longo Reactions Revisited; synthesis of Tetraphenylporphyrins under Equilibrium Conditions", J. Org. Chem., 1987, vol. 52, No. 5, pp. 827–836 (no month given).

J. Arnold, D. Y. Dawson and C. G. Hoffman, "Synthesis and Characterization of Lithium, Sodium, and Potassium Porphyrin Complexes, X–ray Crystal Structures of $Li_2(C_6H_{12}O_2)_2TMPP$, $Na_2(THF)_4OEP$, and $K_2(pyridine)_4OEP$", J. Am. Chem. Soc., 1993, vol. 115, No. 7, pp. 2707–2713 (no month given).

H. Brand, J. A. Capriotti and J. Arnold, "New Lithium Porphyrin Derivatives: Synthesis of $Li_2(P)(Et_2O)_2$ (P=TTP, TBPP) and Solution Structure of $Li_2(TTP)(Et_2O)_2$ by $^7Li$ and $^{15}N$ NMR", Inorg. Chem., 1994, vol. 33, No. 19, pp. 4334–4337. (no month given).

*Primary Examiner*—Necholus Ogden
*Attorney, Agent, or Firm*—Charles E. Bricker; Thomas L. Kundert

[57] ABSTRACT

New lithium ion conducting materials comprise porphyrin rings. These materials function as sites through which the lithium ion passes. In one aspect of the invention, an electrolyte composition consists essentially of a major amount of a lithium porphyrin complex and a minor amount of a polymer binder. In another aspect, an electrolyte composition consists essentially of aligned and spaced lithium porphyrin complex rings, wherein alignment and spacing of the porphyrin rings is achieved through the use of ladder type polymers, comb-like polymers, or crystalline polymers.

16 Claims, 1 Drawing Sheet

ION CONDUCTING ELECTROLYTE MATERIAL CONTAINING A LITHIUM PORPHYRIN COMPLEX

RIGHTS OF THE GOVERNMENT

The invention described herein may be manufactured and used by or for the Government of the United States for all governmental purposes without the payment of any royalty.

BACKGROUND OF THE INVENTION

The present invention is directed to the fabrication of a lithium ion-conducting electrolyte material.

Ion conducting polymer electrolytes with ionic conductivities on the order of $10^{-3}$ S/cm at ambient temperatures have been prepared by incorporating non-aqueous liquid electrolytes into polymer matrices. For example, in a lithium cell, the anion of the lithium salt is bonded to the polymer matrix thus resulting in single ionic conductivity upon dissociation of the salt in the non-aqueous media. Because of the presence of volatile organic plasticizers (non-aqueous liquid) these electrolytes suffer from poor dimensional and thermal stability. In addition they are very susceptible to degradation through corrosion/passivation reactions with lithium metal electrodes. Thus, it is desirable to improve the operating characteristics of electrolytes and to overcome these and other operational limitations inherent in electrochemical devices. One way of overcoming the limitations of the materials currently used in the electrochemical art is to develop and investigate new materials for their potential application in electrochemical cells.

Accordingly, it is an object of the present invention to provide novel lithium ion-conducting materials which can be used as an electrolyte.

Other objects and advantages of the present invention will be apparent to those skilled in the art.

SUMMARY OF THE INVENTION

We have discovered new lithium ion conducting materials which comprise porphyrin rings. These materials function as sites through which the lithium ion passes. In one aspect of the invention, an electrolyte composition consists essentially of a major amount of a lithium porphyrin complex and a minor amount of a polymer binder. In another aspect, an electrolyte composition consists essentially of aligned and spaced lithium porphyrin complex rings, wherein alignment and spacing of the porphyrin rings is achieved through the use of ladder type polymers, comb-like polymers, or crystalline polymers.

DESCRIPTION OF THE PREFERRED EMBODIMENT

Figure 1:
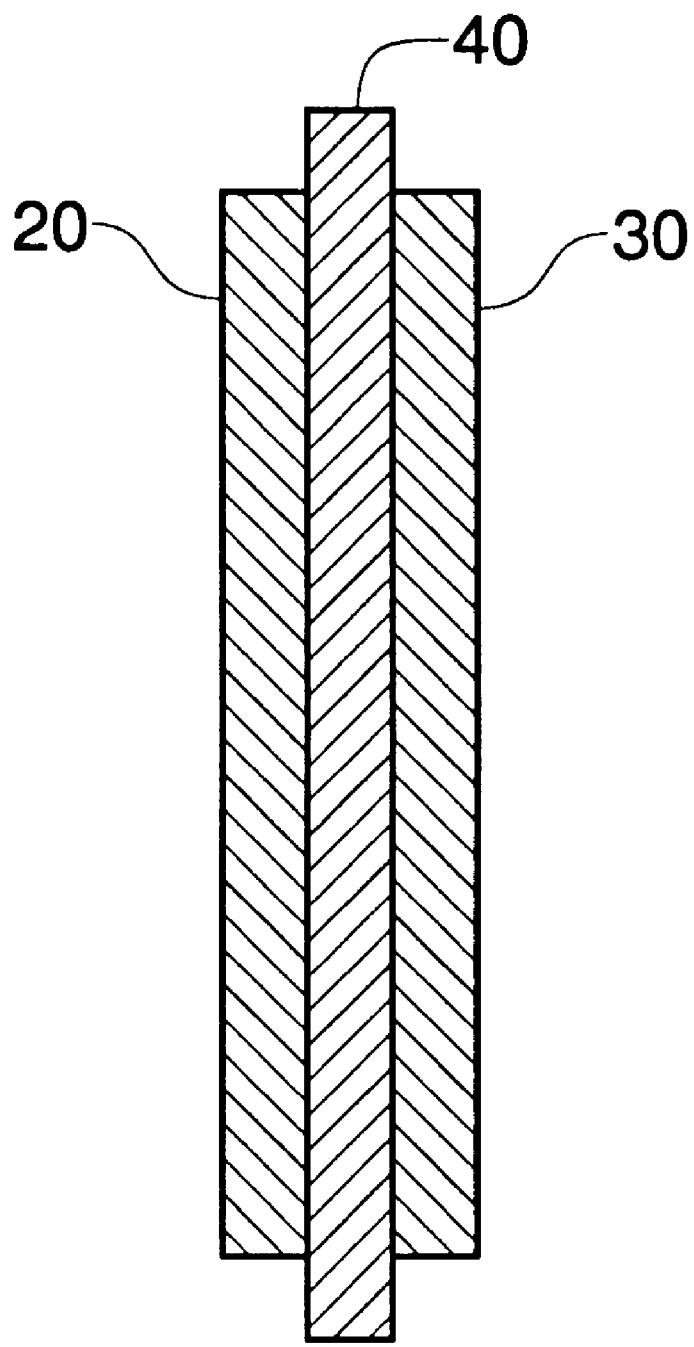
FIG. 1 is a representation of an electrochemical cell including an electrolyte composition in accordance with the invention.

Referring to FIG. 1, there is illustrated a representation of an electrochemical cell 10 including a positive electrode 20, a negative electrode 30 and a polymer electrolyte 40 disposed between the electrodes. Either one or both of the electrodes can be composite electrodes. As used herein and as is generally accepted in the industry, a composite electrode refers to an electrode which includes at least an electrode active material as well as a polymeric material which serves as both binder and to improve conductivity.

The positive electrode 20 may be fabricated including a electrode active material selected from the group of $LiMnO_2$, $V_6O_{13}$, $V_2O_5$, and combinations thereof. The polymeric material used may be either a single polymer or a blend of polymers which provide the desired mechanical strength and high ionic conductivity. The polymer may be selected from the group of, but not limited to, polyesters, polyethers, poly(urethane), poly(ethyloxide), poly(vinylidine fluoride), poly(acrylonitrile), poly(tetrafluoroethylene), and combinations thereof. In a composite electrode, the polymer or polymer blend may comprise up to about 60% of the composite electrode, and typically comprises between five and forty percent of the composite electrode.

The negative electrode 30 or anode of the cell 10 may also be fabricated as a composite electrode. In this case, the composite electrode forming negative electrode 30 includes a polymer or polymer blend as described above with respect to electrode 20. The composite electrode 30 further includes a negative electrode active material selected from the group of materials consisting of carbon, activated carbon, graphite, petroleum coke, lithium alloys, such as LiAl, low voltage lithium intercalation compounds, such as $TiS_2$ and $MoS_2$, and combinations thereof. Once again, the polymer or polymer blend comprises between 5 and 40 percent of the total electrode.

Disposed between the positive and negative electrodes is the polymer electrolyte 40. As noted previously, in one aspect of the invention, the polymer electrolyte composition consists essentially of a major amount of a lithium porphyrin complex and a minor amount of a polymer binder. In another aspect, the polymer electrolyte composition consists essentially of aligned and spaced lithium porphyrin complex rings.

Porphyrins are heterocyclic structures comprising four pyrrole rings linked through their 2- and 5-positions by methine bridges. The parent tetrapyrrole compound, porphin, is shown below:

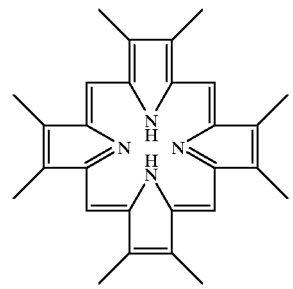

Porphyrins can be covalently attached to other molecules. The electronic features of the porphyrin ring system can be altered by the attachment of one or more substituents. The term "porphyrin" includes derivatives wherein a metal atom is inserted into the ring system, as well as molecular systems in which ligands are attached to the metal. The substituents, as well as the overall porphyrin structure, can be neutral, positively charged, or negatively charged.

Numerous porphyrins have been isolated from natural sources. Notable porphyrin-containing natural products include hemoglobin, the chlorophylls, and vitamin $B_{12}$. Also, many porphyrins have been synthesized in the laboratory, typically through condensation of suitably substituted pyrroles and aldehydes. For example, H. W. Whitlock and R. Hanauer, "Octaethylporphyrin" J. Org. Chem., 1968, Vol. 33, No. 5, pages 2169–2171, disclose the preparation of octaethylporphyrin (OEP) from ethyl 3-ethyl-4-acetyl-5-methylpyrrole-2-carboxylate. J. S. Lindsey, I. C. Schreiman, H. C. Hsu, P. C. Kearney and A. M. Marguerattaz, "Rothemund and Adler-Longo Reactions Revisited: synthesis of Tetraphenylporphyrins under Equilibrium Conditions", J. Org. Chem., 1987, Vol. 52, No. 5, pages 827–836, disclose the preparation of several tetraphenylporphyrins, including meso-tetraphenylporphyrin (TPP), by the reaction of pyrrole with the corresponding benzaldehyde. Meso-tetra-p-tolylporphyrin (TTP), meso-tetrakis(4-tert-butylphenyl) porphyrin (TBPP) and meso-tetrakis(3,4,5-trimethoxyphenyl)porphyrin (TMPP) can be prepared following this procedure.

Lithium complexes of these porphyrins can be synthesized as shown below:

$H_2(Por) + 2LiN(SiMe_3)_2 \rightarrow Li_2(Por)(solv)_n + 2HN(SiMe_3)_2$ where Por is OEP, TPP, TTP, TBPP or TMPP, solv is tetrahydrofuran (THF) or dimethoxyethane (DME) and n has a value of 2–4. Synthesis of these lithium complexes is disclosed in J. Arnold, D. Y. Dawson and C. G. Hoffman, "Synthesis and Characterization of Lithium, Sodium, and Potassium Porphyrin Complexes. X-ray Crystal Structures of $Li_2(C_6H_{12}O_2)_2TMPP$, $Na_2(THF)_4OEP$, and $K_2(pyridine)_4OEP$", J. Am. Chem. Soc., 1993, Vol. 115, No. 7, pp 2707–2713, and in H. Brand, J. A. Capriotti and J. Arnold, "New Lithium Porphyrin Derivatives: Synthesis of $Li_2(P)(Et_2O)_2$ (P=TTP, TBPP) and Solution Structure of $Li_2(TTP)(Et_2O)_2$ by $^7Li$ and $^{15}N$ NMR", Inorg. Chem., 1994, Vol. 33, No. 19, pp 4334–4337.

We have shown through computer modeling that a lithium ion can either reside in the center of a porphyrin ring forming a complex anion or lithium ions can be centered above and below the porphyrin ring forming a dilithium salt. Defining two porphyrin rings as site 1 and site 2, we have shown that a lithium ion can move between sites and the porphyrin rings stay aligned. Alignment of the porphyrin rings can be ensured by linking the porphyrin rings with spacing units, such as, for example, ethylene and anthracene, as disclosed by Therien et al, U.S. Pat. No. 5,493,017, issued Feb. 20, 1996. Use of a coupling agent such as cis-bis-(tri-n-butyltin)ethylene, provides (1) a comb-like material of the formula:

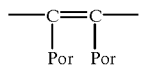

wherein Por is as defined previously, and/or (2) a ladder-like material having the ethylene coupling on both sides of the Por units.

In the one aspect of the invention, wherein the electrolyte composition consists essentially of a major amount of a lithium porphyrin complex and a minor amount of a polymer binder the quantity of such polymer can range from about 1 to about 49 percent, preferably about 5 to 15 percent. The polymer may be selected from the group of, but not limited to, poly(ethylene oxide), poly(vinylidine fluoride), poly (acrylonitrile), poly(tetrafluoroethylene), and combinations thereof. Fabrication of the electrolyte comprises the steps of mixing the porphyrin complex with the polymer and forming an electrolyte article of desired thickness. Such forming can be accomplished, for example, by simply compressing the porphyrin/binder mixture between flat plates to a desired thickness.

In the second aspect of the invention, wherein the electrolyte composition consists essentially of aligned and spaced lithium porphyrin complex rings, a lithium porphyrin complex containing a reactive functionality is contacted with a second compound which is reactive with the functionality contained within the porphyrin. For example, dibrominated porphyrin units can be reacted with a metal-containing linking unit such as cis-bis(tri-n-butyltin)ethene to form cofacial and polymeric units. Through careful substituent selection the lithium porphyrin complexes can be incorporated into virtually any polymeric matrix known in the art, including but not limited to polyacetylenes, polyacrylates, polyolefins, polyethers, polyurethanes, polycarbonates, polyanilines, polypyrroles, and polythiophenes. The material is then formed into an electrolyte article of desired thickness.

For use in a cell, the positive and negative electrodes and the polymer electrolyte of this invention must be assembled into a package. Design and fabrication of suitable packaging arrangements are within the purview of those skilled in the art. Generally, such cells are assembled in a controlled environment and then sealed with some type of case structure.

Various modifications may be made in the present invention without departing from the scope of the appended claims.

We claim:

1. An electrolyte composition consisting essentially of a major amount of a lithium porphyrin complex and a minor amount of a polymer binder.

2. The composition of claim 1 wherein said lithium porphyrin complex is $Li_2(Por)(solv)_n$ wherein solv is tetrahydrofuran or dimethoxyethane, Por is selected from the group consisting of octaethylporphyrin, meso-tetraphenylporphyrin, meso-tetra-p-tolylporphyrin, meso-tetrakis(4-tert-butylphenyl)porphyrin and meso-tetrakis(3,4,5-trimethoxyphenyl)porphyrin and n has a value of 2–4.

3. The composition of claim 2 wherein Por is octaethylporphyrin and solv is dimethoxyethane.

4. The composition of claim 2 wherein Por is octaethylporphyrin and solv is tetrahydrofuran.

5. The composition of claim 2 wherein Por is meso-tetraphenylporphyrin and solv is dimethoxyethane.

6. The composition of claim 2 wherein Por is meso-tetraphenylporphyrin and solv is tetrahydrofuran.

7. The composition of claim 2 wherein Por is meso-tetra-p-tolylporphyrin and solv is dimethoxyethane.

8. The composition of claim 2 wherein Por is meso-tetra-p-tolylporphyrin and solv is tetrahydrofuran.

9. The composition of claim 2 wherein Por is meso-tetrakis(4-tert-butylphenyl)porphyrin and solv is dimethoxyethane.

10. The composition of claim 2 wherein Por is meso-tetrakis(4-tert-butylphenyl)porphyrin and solv is tetrahydrofuran.

11. The composition of claim 2 wherein Por is meso-tetrakis(3,4,5-trimethoxyphenyl)porphyrin and solv is dimethoxyethane.

12. The composition of claim 2 wherein Por is meso-tetrakis(3,4,5-trimethoxyphenyl)porphyrin and solv is tetrahydrofuran.

13. The composition of claim 1 wherein the quantity of polymer binder is about 1 to about 49 percent.

14. The composition of claim 13 wherein the quantity of polymer binder is about 5 to about 15 percent.

15. The composition of claim 1 wherein said polymer binder is selected from the group consisting of poly(ethylene oxide), poly(vinylidine fluoride), poly(acrylonitrile), poly(tetrafluoroethylene), and combinations thereof.

16. An electrolyte composition consisting essentially of aligned and spaced lithium porphyrin complex rings, wherein alignment and spacing of the porphyrin rings is achieved through the use of ladder type polymers, comb-like polymers, or crystalline polymers.

* * * * *